United States Patent [19]

Terada et al.

[11] Patent Number: 4,529,159
[45] Date of Patent: Jul. 16, 1985

[54] SEAT STRUCTURE FOR AN AUTOMOTIVE VEHICLE

[75] Inventors: Takami Terada, Toyota; Kuniyoshi Harada, Takahama, both of Japan

[73] Assignee: Aisin Seiki Kabushiki Kaisha, Kariya, Japan

[21] Appl. No.: 491,189

[22] Filed: May 3, 1983

[30] Foreign Application Priority Data

May 4, 1982 [JP] Japan .......................... 57-065254[U]

[51] Int. Cl.³ ................................................ E01B 7/00
[52] U.S. Cl. ..................................... 248/421; 297/313
[58] Field of Search ............... 248/157, 419, 421, 422; 74/96, 97, 105; 297/325, 313, 330, 319

[56] References Cited

U.S. PATENT DOCUMENTS

| | | | |
|---|---|---|---|
| 2,132,009 | 10/1938 | Ball | 248/422 |
| 3,912,215 | 10/1975 | Reinmoller et al. | |
| 4,128,225 | 12/1978 | Kluting | 248/422 |
| 4,422,611 | 12/1983 | Kitsuda | 248/421 |

FOREIGN PATENT DOCUMENTS

| | | | |
|---|---|---|---|
| 2626441 | 12/1977 | Fed. Rep. of Germany | 248/421 |
| 56-31834 | 3/1981 | Japan | 297/313 |
| 2081082 | 2/1982 | United Kingdom | 297/330 |

*Primary Examiner*—William H. Schultz
*Assistant Examiner*—Robert A. Olson
*Attorney, Agent, or Firm*—Finnegan, Henderson, Farabow, Garrett and Dunner

[57] ABSTRACT

A structure for adjusting the height of the seat of an automotive vehicle including a handle-operated coupler for pivoting supporting members at the four corners of the cushion, the supporting members being mechanically coupled together for raising or lowering the cushion vertically upon the pivoting of an activator supporting member adjacent the handle. The coupler includes a driving device and a coaxial driven device operatively interconnected by a spring coiled about at least a portion of the driving device and driven device, and a housing including a shell closely fitted about the coiled spring. A driven pin is securely fitted to the actuator supporting member for pivoting the actuator supporting member upon the application of lateral force to the driven pin. The driven device includes a driving pin linked to the driven pin for pivoting the actuator supporting member upon the rotation of the handle. A load on the cushion applies a reverse force on the driving pin through the driven pin and link expanding the coiled spring against the shell to maintain the cushion at the adjusted height.

4 Claims, 4 Drawing Figures

SEAT STRUCTURE FOR AN AUTOMOTIVE VEHICLE

BACKGROUND OF THE INVENTION

1. Field of the Invention

This invention relates to a structure for a seat for an automotive vehicle and more particularly to a device for adjusting the height of a cushion member of such a seat.

2. Description of the Prior Art

In a conventional automobile seat structure 10, as shown in FIG. 1, a cushion member 31 is supported by a first supporting member 18, a second supporting member 19, a third supporting member 21 and a fourth supporting member 28. The four supporting members 18, 19, 21 and 28 are formed as bell cranks and are so mechanically coupled together that they may be moved simultaneously for adjusting the height of the cushion member 31 upon pivoting of the first supporting member 18.

In order to rotate the first supporting member 18, a handle-operated coupler 40 is conventionally employed. The coupler 40 has a rotating member 60 including a pinion 61 which is in mesh with a geared portion 62 of the first supporting member 18.

However, backlash may be generated between the pinion 61 and the geared portion 62. With a view to avoiding such backlash, extremely high accuracy or precision is required for manufacturing the pinion 61 and the geared portion 62 with attendant high costs.

SUMMARY OF THE INVENTION

It is, therefore, a primary object of this invention to provide an automotive vehicle seat without backlash in the height-adjusting mechanism and to reduce the cost of manufacture.

This and other objects have been attained by a structure for adjusting the height of the seat of an automotive vehicle comprising a pair of base members parallelly spaced in the longitudinal direction of the vehicle, four supporting members pivotally mounted on said base members, a pair of said supporting members being pivoted to each base member for supporting the cushion of said seat approximately at the corners thereof, said supporting members being mechanically coupled together for raising or lowering said cushion upon the pivoting of a predetermined one of said supporting members, handle-operated coupler means rotatably mounted in one of said base members adjacent said predetermined one of said supporting members, said coupler means including rotatable driving means operatively connected to said handle, a pin securely fixed to said predetermined one of said supporting members for pivoting the latter supporting member upon application of force to said pin, and means for linking said pin to said driving means for pivoting said predetermined one of said supporting members upon rotation of said handle.

Preferably the driving means includes a driving device and a driven device operatively coupled by a coil spring. The driving means includes a housing having a shell closely fitted about the coil spring.

The linking means preferably includes a driving pin offset radially from the axis of the driving means and a link between the driving pin and the pin fixed in the predetermined supporting member. A load on the cushion applies reverse force on the link tending to expand the coil spring against the shell, thus braking the reverse force and maintaining the cushion in its adjusted position.

According to this invention, the prior necessary high precision and resultant high costs in the manufacturing of automotive vehicle seats are decreased.

DETAILED DESCRIPTION OF THE PREFERRED EMBODIMENT

Figure 1:
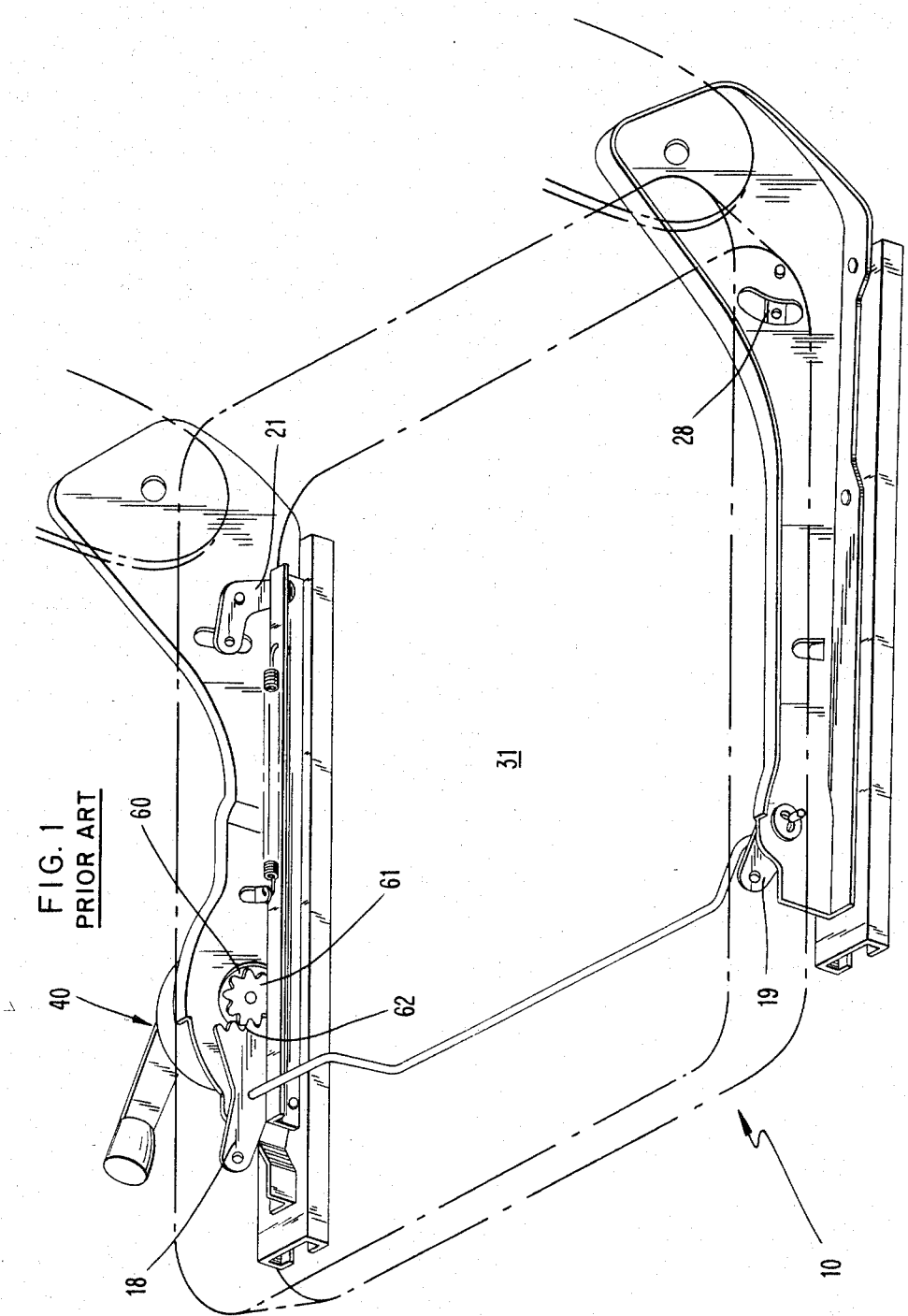
FIG. 1 is a perspective view of a conventional support structure for a automotive vehicle seat.
Figure 2:
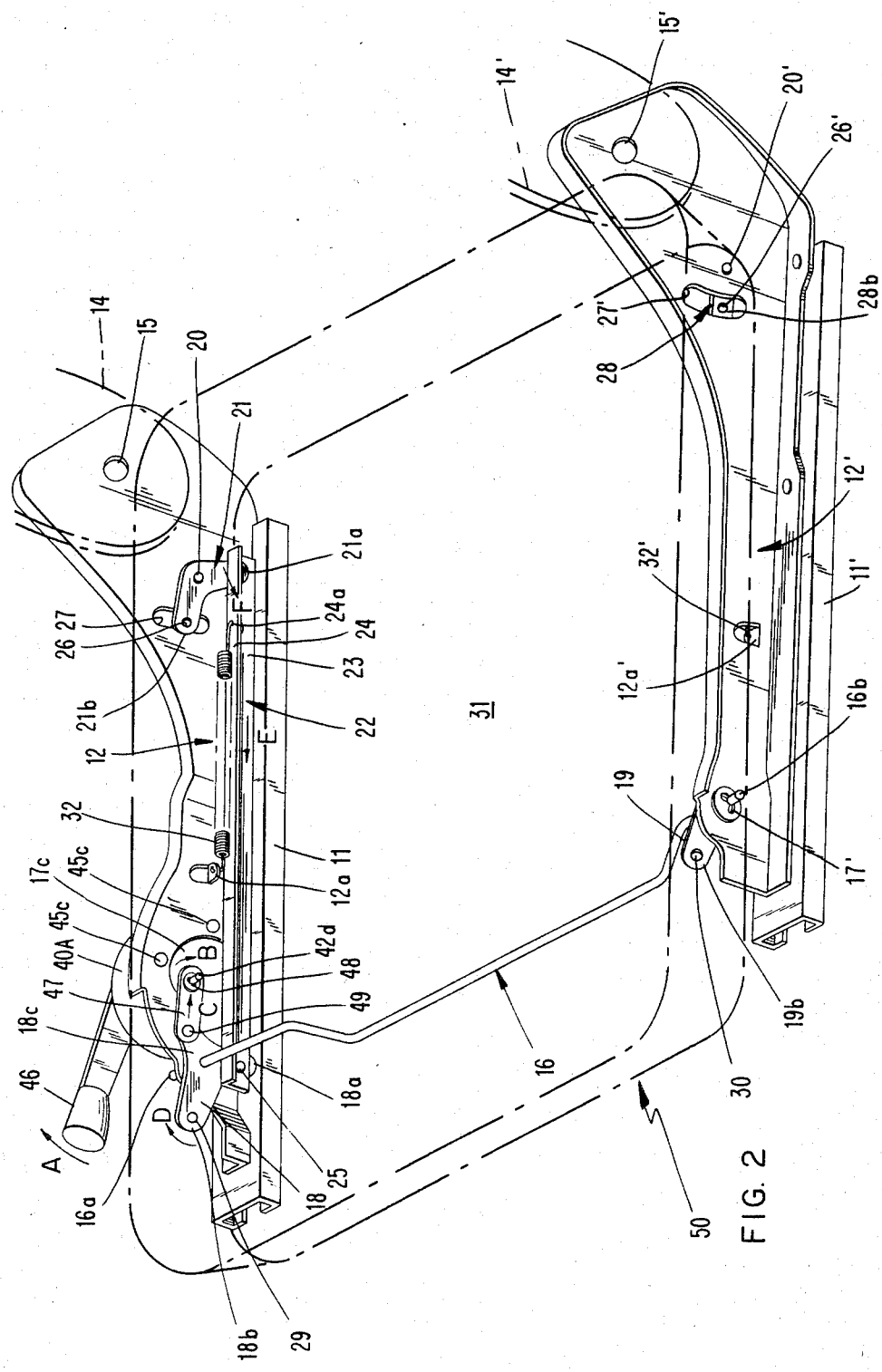
FIG. 2 is a perspective view of the support structure of an automotive vehicle seat in accordance with this invention.
Figure 3A:
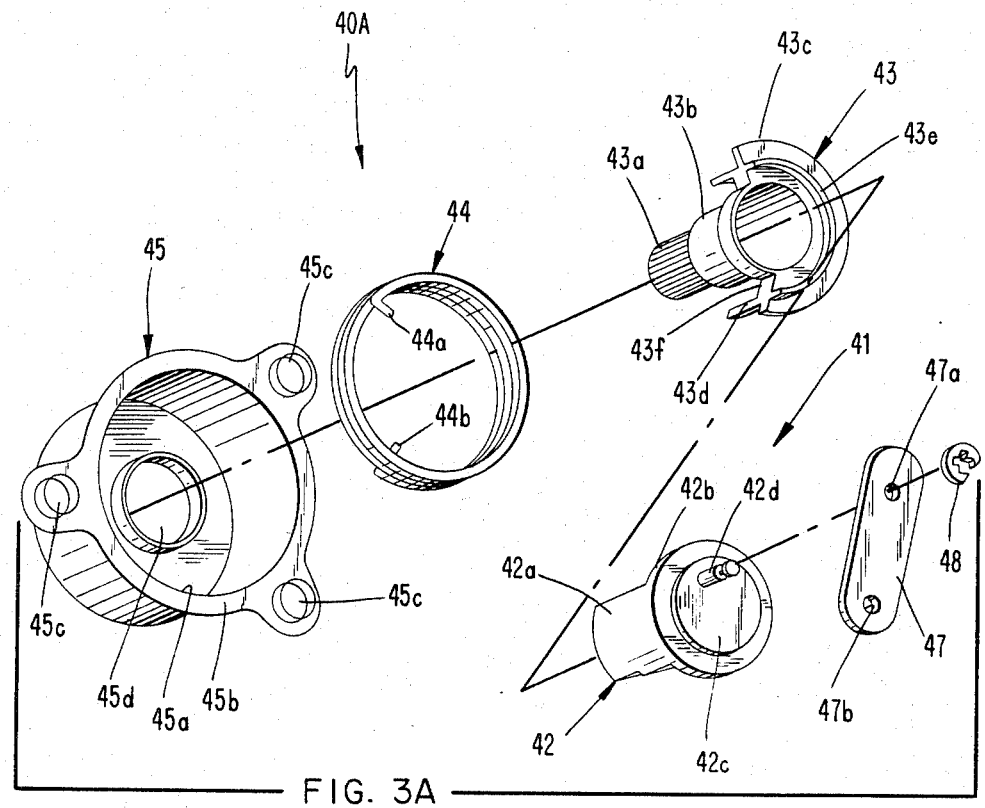
FIG. 3A is an exploded view of a portion of the height-adjusting device of the structure of in FIG. 2.
Figure 3B:
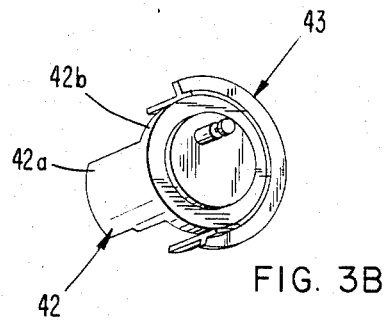
FIG. 3B is a perspective view of driven member 42 and driving member 43 shown in FIG. 3A.

Referring now to FIGS. 2, 3A and 3B, the automotive vehicle seat structure 50, according to the invention, has a pair of sliding members 11 and 11' parallelly spaced and extending in the longitudinal direction of a vehicle (not shown). The members 11 and 11' are slidably mounted on a pair of conventional rails (not shown), each of which is fixedly connected to a floor (not shown) of the vehicle in the usual manner, so the members are movable in the longitudinal direction of the vehicle. Each of the sliding members 11 and 11' has fixedly connected thereto an individual one of a pair of base members 12 and 12', respectively.

A back portion of the seat has a pair of arms 14 and 14' extending from opposite side portions thereof in the downward direction. The arms 14 and 14' are hingedly connected to the rear end portions of the base members 12 and 12', respectively, by pins 15 and 15'. Opposite end portions 16a and 16b of a rod member 16 are rotatably journaled in the front end portions of the base members 12 and 12', respectively, and are, respectively, secured thereto by E-rings 17 and 17' (only 17' is shown).

The first supporting member 18 is fixedly mounted on the left end portion 16a of the rod member 16 by suitable means such as welding and positioned inside the base member 12 with a slight clearance therefrom. Similarly, the second supporting member 19 is fixedly mounted on the right end portion 16b of the rod 16. Thus, the second supporting member 19 is operatively connected to the first supporting member 18 by the rod 16. As a result, the second supporting member 19 is moved synchronously with the first supporting member 18.

To the inside of the rear end portion of the base member 12, there is fixedly mounted a pin 20 about which the third supporting member 21 is pivotable. A link member 22 operatively connects the third supporting member 21 to the first supporting member 18. The link member 22 has an L-shaped cross-sectional configuration with a vertical wall 23 and an integral horizontal wall 24. Opposite end portions of the vertical wall 23 of the link member 22 are rotatably connected to a lower leg 21a of the third supporting member 21 and a lower leg 18a of the first supporting member 18 by means of pins 25 (only one is shown). The third supporting member 21 also has an upper leg 21b with a hole 26 opposed to a slot 27 in the base member 12.

To the inside of the other base member 12', there is securely fixed a pin 20' on which the fourth supporting member 28 pivots. The seat structure includes a link interconnecting the second supporting member 19 with a lower leg of the fourth supporting member 28 acting like the link member 22. The fourth supporting member 28 also has an upper leg with a hole 26' therein opposed to a slot 27' in the base member 12'.

The first supporting member 18 and the second supporting member 19 have respectively an upper leg 18b with a hole 29 and an upper leg 19b with a hole 30. The cushion member 31 is attached to the seat structure, as described, by bolts or other convenient connecting means operating through the holes 29 and 30 on the first and second supporting members 18 and 19, respectively, and through the opposed holes 26, 26' in the third and fourth supporting members 21 and 28, respectively, as well as through the slots 27, 27'.

A spring 32 is disposed between a projection 12a on the base member 12 and a hole 24a in the link member 22 so as to tend to rotate the third supporting member 21 in the clockwise direction as indicated by arrow F. Similarly, another spring 32' is disposed along the other base member 12' side so as to tend to rotate the fourth supporting member 28 in the clockwise direction.

The cushion member 31 is therefore supported by the four supporting members 18, 19, 21 and 28, and may be moved vertically upon pivoting of the first supporting member 18 by the handle 46 and corresponding movements of the upper legs 18b, 19b, 21b and 28b of the supporting members.

In order to pivot the first supporting member 18 clockwise or counter-clockwise, a handle-operated spring coupler means 40A (FIG. 3A) interacts between the handle 46 and the first supporting member. The spring coupler means 40A includes a rotatable member 41 which is divided axially into a first division 42, comprising a driven device, and a second coaxial division 43, comprising a driving device. The first division 42 has an engaging portion 42a, and, coaxial therewith, an annular portion 42b and a circular projection 42c. The engaging portion 42a is formed with a cross-sectional configuration approximately as a sector of an annulus. An eccentric pin 42d projects outwardly from the circular projection 42c parallel to the axis of the coaxial elements 42a, 42b, and 42c but offset radially therefrom.

The second division 43 includes cylinder having an outer portion 43a with a milled surface, an intermediate portion 43b with a circular cross section, and a portion 43c adjoining the intermediate portion. The portion 43c has a cross section in the form of an arc of a circle of larger diameter than portion 43b with a flange 43d and an inner coaxial circular channel 43e. The flange 43d spaced inwardly from the circumferential surface of the portion 43c forms a recessed area 43f partially around one end of the intermediate portion 43b. The portion 43c with its flange 43d, the channel 43e, and the recess 43f forms an arc of an incomplete circle.

Upon the combination of the first and the second divisions 42 and 43 for assembling the rotatable member 41, the sector-shaped engaging portion 42a of the first division 42 is inserted into the open area of the incomplete circle of the division 43, the annular portion 42b engaging the channel 43e. The sector-shaped engaging portion 42a and the open area of the incomplete circle of the division 43 substantially complement each other to complete a circular cross-section. However, sufficient clearance is left between the engaging portion 42a and the division 43 for a slight rotation of the division 42 with respect to the division 43 with the cooperation of the annular portion 42b in the channel 43e.

A coil spring 44 is mounted on the outer surface of the flange 43d with tangs 44a and 44b on the ends of the spring inserted into the clearances between the sides of the sector-shaped engaging portion 42a and the arcuate portion 43c of division 43.

A housing 45 for receiving the rotatable member 41 with the spring 44 mounted thereon includes an annular shell open at one end and partially closed at the other. Around the open end is a flange 45b having mounting projections 45c extending outwardly therefrom. The partially closed end includes a coaxial aperture 45d.

Upon housing the rotating member 41 and the coil spring 44, the milled end portion 43a extends outwardly through the aperture 45d for attachment of the handle 46 thereto. The housing 45 is fixedly mounted on the outside surface of the base member 12 by any convenient means, such as inserting the shell of the housing 45 through an aperture in the base member. The projections 45c may then be secured to the base member 12 by riveting, caulking or other convenient means. The pin 42d on the surface of the projection 42c extends inwardly from the surface of the base member 12 on the opposite side from the handle 46.

An arm or link 47 interconnects the eccentric pin 42d with the first supporting member 18. The pin 42d extends through an aperture 47a in one end of the arm 47 and is rotatable therein secured by an E-ring 48. A leg 18c on the first supporting member 18 carries a pin 49 which is inserted into an aperture 47b in the other end of the arm 47. The pin 42d thus becomes a driving pin and the pin 49 becomes a driven pin.

In operation, when the handle 46 is rotated in the direction indicated by arrow A, i.e. clockwise, the rotatable member 41 including the first and second divisions 42 and 43 is rotated in the direction indicated by B, i.e., also clockwise, with result that the arm 47 is moved in the direction indicated by arrow C, i.e. toward the rear, due to rotation of the eccentric pin 42d about the axis of first division 42. Thus, the first supporting member 18 becomes the actuator supporting member and is pivoted clockwise in the direction indicated by arrow D. Simultaneously, the third supporting member 21 is rotated in the clockwise direction in accordance with the movement of the link member 22 in the direction indicated by arrow E, i.e., toward the front, the second supporting member 19 is rotated in the clockwise direction in accordance with clockwise rotation of the rod member 16, and the fourth supporting member 28 is rotated in the clockwise direction in accordance with movement of the link member 22'. Therefore, the height of the cushion 31 is increased.

If the handle 46 is rotated in the counter-clockwise direction, the height of the cushion is lowered by the reverse action of the relevant components of the seat structure, as described.

Upon application of load on the cushion member 31, downward pressure is applied to the support members 18, 19, 21 and 28 tending to pivot them in the counterclockwise direction, thus tending also to pull the pin 42d through the link 47 to rotate the engaging portion 42a counter-clockwise about its axis. The engaging portion 42a acts upon one of the tangs of the coil spring 44, thus expanding the spring in the radial direction, thereby pressing the spring against the inner surface of the housing 45 and braking the movement of the engaging portion 42a. Thus, the counter-clockwise movement of the supporting members 18, 19, 21 and 28 is restrained and the cushion 31 is kept at its adjusted level.

We claim:

1. A structure for adjusting the height of a cushion of a seat of an automotive vehicle comprising:
   a pair of parallel base members, spaced apart and extending in the longitudinal direction of the vehicle;
   four supporting members pivotally mounted on said base members, a pair of said supporting members being pivoted to each base member for supporting the cushion of said seat approximately at the corners thereof, said supporting members being mechanically coupled together for raising or lowering said cushion relative to said base members upon the pivoting of a predetermined one of said supporting members positioned at one of said forward corners;
   handle-operated coupler means rotatably mounted in one of said base members behind said predetermined one of said supporting members, said coupler means including:
   rotatable driving means connected to said handle;
   a fixed housing having an opening therethrough for receiving said driving means;
   a driven member coaxially positioned with respect to said driving means;
   a first pin securely fixed to said predetermined one of said supporting members for pivoting the latter supporting member upon application of force to said first pin;
   a second pin fixedly secured to said driven member and radially spaced from the axis thereof;
   a link interconnecting said pins for pivoting said predetermined one of said supporting members upon rotation of said handle in a first direction to rotate said driving means and driven member in said first direction to raise the seat; and
   a spring means interposed between said housing and said driven member, said spring means having an end engaged by said driven member, when a load is placed on said cushion, to pivot and to rotate said second pin and said driven member in a second direction opposite to said first direction to cause said spring means to lock said driven member relative to said housing and hold said seat from further downward movement.

2. A structure for adjusting the height of the seat of an automotive vehicle comprising:
   a pair of parallel, spaced base members extending in the longitudinal direction of the vehicle;
   four supporting members pivotally mounted on said base members, a pair of said supporting members being pivoted to each base member for supporting the cushion of said seat approximately at the corners thereof, said supporting members being mechanically coupled together for raising or lowering said cushion upon the pivoting of a predetermined one of said supporting members positioned at a front corner of said cushion;
   handle-operated coupler means rotatably mounted in one of said base members behind said predetermined one of said supporting members, said coupler means including rotatable driving means operatively connected to said handle, a pin securely fixed to said predetermined one of said supporting members for pivoting the latter supporting member upon application of force to said pin, a pin fixedly secured to said rotatable driving means and radially spaced from the axis thereof and, a link interconnecting said pins for pivoting said predetermined one of said supporting members upon rotation of said handle;
   said driving means having a driving device and a driven device and a spring operatively coupled between said devices;
   said spring being coiled about at least a portion of said driving device and said driven device and wherein said coupler means includes a housing for said driving means, said housing including a shell closely fitted about said coiled spring whereby a load on said cushion applied a force to said link tending to expand said coiled spring radially against the shell of said housing;
   said driving device also having a shaft extending outside said housing for mounting a handle thereon and said driving device further includes at the end opposite said shaft a circular portion of greater diameter than said shaft, but of less than 360° of arc, leaving a sector-shaped open area, and wherein said driven device is co-axial with said driving device and includes a sector-shaped engaging portion extending into said sector-shaped open area of said driving device and substantially complementary thereto.

3. The structure of claim 2 wherein the surface of said driving device opposite said coaxial driven device includes an arcuate channel and wherein said driven device includes a circular projection received in said channel, said sector-shaped area and sector-shaped engaging portion being dimensioned to provide small amounts of clearance therebetween, and wherein said spring includes inwardly turned tangs at the ends thereof engaged in individual ones of said clearances on each side of said sector-shaped engaging portion.

4. A structure for adjusting the height of a cushion of a seat of an automotive vehicle comprising:
   a pair of parallel base members, spaced apart and extending in the longitudinal direction of the vehicle;
   four supporting members pivotally mounted on said base members, a pair of said supporting members being pivoted to each base member for supporting the cushion of said seat approximately at the corners thereof, said supporting members being mechanically coupled together for raising or lowering said cushion relative to said base members upon the pivoting of a predetermined one of said supporting members positioned at one of said forward corners;
   handle-operated coupler means rotatably mounted in one of said base members behind said predetermined one of said supporting members, said coupler means including:
   rotatable driving means connected to said handle;
   a fixed housing having an opening therethrough for receiving said driving means;
   a driven member coaxially positioned with respect to said driving means, said driven member being rotatable in response to the rotation of said driving means;
   a first pin securely fixed to said predetermined one of said supporting members for pivoting the latter supporting member upon application of force to said first pin;
   a second pin fixedly secured to said driven member and radially spaced from the axis thereof;

a link interconnecting said pins for pivoting said predetermined one of said supporting members upon rotation of said handle to rotate said driving means and driven member to adjust the height of the seat; and a spring means interposed between said housing and said driven member, said spring means being engaged by said driven member and said driving means, when a load is placed on said cushion, to pivot and to rotate said second pin and said driven member to cause said spring means to lock said driven member and said driving means relative to said housing and hold said seat from further downward movement, said driving means being turned by rotation of said handle, to unlock said driving means and driven member relative to said housing and further adjust the height of said seat.

* * * * *